United States Patent [19]
Musschoot

[11] 3,882,996
[45] May 13, 1975

[54] VIBRATORY MATERIAL HANDLING APPARATUS

[75] Inventor: Albert Musschoot, Barrington, Ill.

[73] Assignee: General Kinematics Corporation, Barrington, Ill.

[22] Filed: Mar. 22, 1973

[21] Appl. No.: 343,918

[52] U.S. Cl. .......................................... 198/220 DB
[51] Int. Cl. .............................................. B65g 27/00
[58] Field of Search.... 198/220 DB, 220 A; 74/206, 74/61, 202

[56] References Cited
UNITED STATES PATENTS

| 420,544 | 2/1890 | Peckham | 74/206 |
|---|---|---|---|
| 1,436,373 | 11/1922 | Walk | 74/206 X |
| 2,947,183 | 8/1960 | Corrier et al. | 198/220 DB |
| 3,449,969 | 6/1969 | Dorris | 74/61 |

Primary Examiner—Richard A. Schacher
Assistant Examiner—Douglas D. Watts
Attorney, Agent, or Firm—Hofgren, Wegner, Allen, Stellman & McCord

[57] ABSTRACT

A vibratory material handling apparatus including a material engaging surface and a vibration imparting device for vibrating the surface. The latter includes a pair of parallel, rotary shafts each mounting an eccentric weight and a prime mover for rotating one of the shafts. The shafts are interconnected so that when the one shaft is rotated, the other will be rotated in the opposite direction and the interconnection is such that there is a substantially positive driving connection between the two shafts which will allow limited slippage so the eccentric weights may synchronize relative to each other and to the center of gravity of the apparatus.

6 Claims, 3 Drawing Figures

PATENTED MAY 13 1975  3,882,996

VIBRATORY MATERIAL HANDLING APPARATUS

BACKGROUND OF THE INVENTION

This invention relates to vibratory material handling devices and, more specifically, to vibratory material handling devices employing a vibratory exciter including two parallel rotary shafts each mounting an eccentric weight.

Recent years have seen a substantial upsurge in the use of vibratory material handling devices as, for example, vibratory conveyors, vibratory material classifiers, etc., due to the fact that they frequently require less energy for operation than other types of conveyors or material handlers and are simpler in construction, thereby reducing maintenance problems and increasing reliability.

Many such vibratory material handling devices employ a vibratory exciter for a material handling surface including a pair of generally parallel, rotary shafts each bearing an eccentric weight. The shafts are driven in opposite directions at the same angular velocity and the weights are arranged on the shafts such that the resulting vibratory forces are cancelled out in all but the direction in which the vibratory force is to be imparted to the material handling surface.

It has been determined that for such apparatus wherein the two shafts are positively interconnected, as by gears, with the usual orientation of the weights on their respective shafts, the direction of force application will be transverse to a plane encompassing the two shafts and located at a point mid-way between the rotative axes of the two shafts. It has also been determined that the direction of force application should pass through the center of gravity of the material handling apparatus so that all portions of the material engaging surface thereof are subject to vibration of the same amplitude.

Because of the foregoing, the prior art has taken a number of steps to insure that the exciter can be secured to the material handling surface so that direction of force application not only passes through the center of gravity of the apparatus, but through the plane defined by the two shafts transversely thereto at a point mid-way between the shafts. For example, U.S. Pat. No. 2,312,477 to Pollitz describes the use of adjusting means whereby the position of the exciter on the material handling surface can be varied so that the foregoing relationship can be achieved.

When the relationship is not achieved, a number of problems arise. Where a single prime mover is employed to drive both shafts with the shafts having a positive interconnection between themselves as, for example, gears, when the relationship is not achieved, the eccentrics will tend to synchronize so that the direction of force application, while not being transverse to the plane defined by the shafts, will pass through a point mid-way between the two shafts. When such occurs, "backlash" between the gears will result. Such backlash increases the noise levels attendant operation of the apparatus and is undesirable for this reason alone. Moreover, such backlash will increase the wear on the gears with the result that the exciter will fail mechanically at an earlier point in time due to such an increased rate of deterioration.

On the other hand, to overcome such problems as proposed by Pollitz identified above, additional manufacturing operations have to be performed in fabricating the apparatus to provide the capability of adjustment thereby increasing the cost of the apparatus. Moreover, considerable time may be expended upon installation of the apparatus to achieve the desired adjustment of the exciter relative to the center of gravity of the apparatus thereby increasing installation costs as well.

SUMMARY OF THE INVENTION

It is the principal object of the invention to provide a new and improved vibratory material handling apparatus. More particularly, it is an object of the invention to provide a vibratory material handling apparatus including an exciter of the type employing two, parallel, rotary shafts each bearing an eccentric weight and driven by a single prime mover which may be inexpensively constructed and which does not require time-consuming adjustments during installation.

The exemplary embodiment of the invention achieves the foregoing objects in a vibratory material handling device including a surface adapted to engage material to be handled and a vibratory exciter therefor of the type having a pair of parallel shafts mounted for rotation and each bearing a respective eccentric. A single prime mover is employed to rotate one of the shafts and the shafts are interconnected by unique means which provide for a substantially positive driving connection while allowing limited slippage so that the eccentric weights may synchronize relative to each other and to the center of gravity of the apparatus when the line of force would not pass through the center of gravity of the apparatus in a particular configuration of the eccentrics with respect to each other. Such slippage allows the direction of force application to be rotated relative to the plane defined by the shaft until the same extends through the center of gravity of the apparatus so that there will not be unequal amplitude of vibration at various parts in the surface. To eliminate one drawback in prior art apparatus without requiring additional fabrication costs due to the need for providing adjustable mounting for the exciter on the apparatus while eliminating the other major problem with prior art apparatus, namely, the requirement of a time-consuming adjustment at the time of installation.

A preferred interconnecting means also eliminates the problem of rapid deterioration of prior art elements such as gears, due to backlash or the like. According to a preferred embodiment of the invention, the interconnecting means comprise a pair of cylindrical discs of the same diameter and each mounted on a respective one of the parallel shafts such that their cylindrical peripheries are in engagement with each other. Preferably, the discs are formed of a resilient material having a relatively high coefficient of friction to establish a substantially positive driving connection while allowing limited slippage.

The preferred embodiment of the invention, when resilient discs are employed, also contemplates that the spacing between the two shafts be less than the diameter of one of the discs so that, at the point of contact of the two discs, there is area contact as opposed to line contact to insure a more positive driving connection while nonetheless permitting limited slippage to allow the shafts to synchronize relative to each other and to the center of gravity of the apparatus.

Other objects and advantages of the invention will become apparent from the following specification taken in conjunction with the accompanying drawings.

DESCRIPTION OF THE PREFERRED EMBODIMENT

Figure 1:
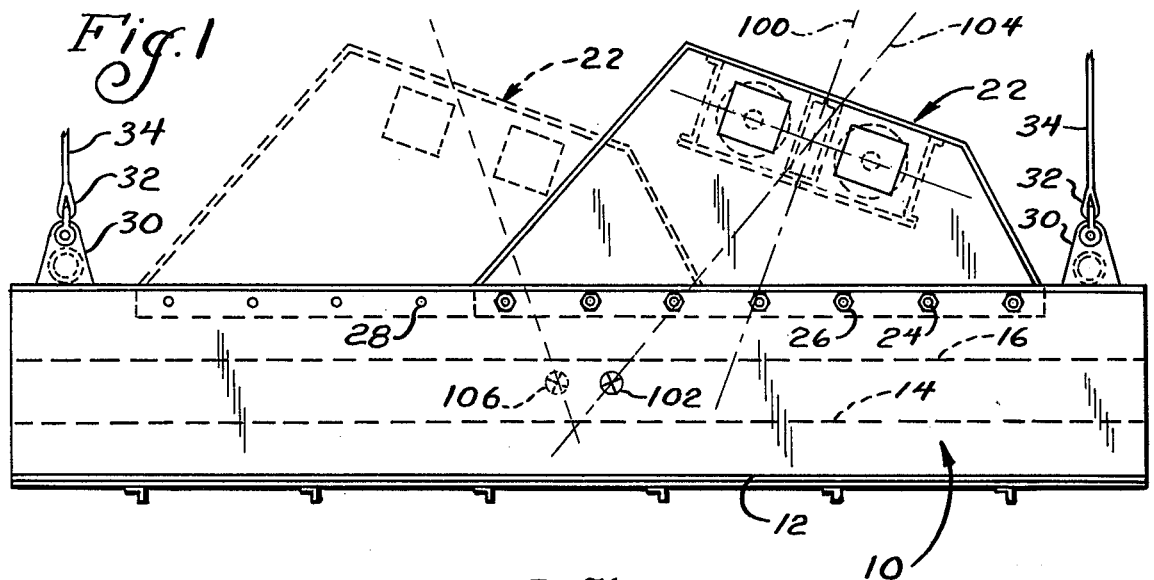
FIG. 1 is a side elevation of a vibratory material handling device embodying the invention.

One form of a vibratory material handling apparatus made according to the invention is illustrated in the drawings and, with reference to FIG. 1, is seen to be a vibratory, material classifier. The same includes a trough-like member, generally designated 10, having an imperforate bottom 12 and upwardly spaced classifying screens 14 and 16. The screens 14 and 16 are secured in their spaced relation as illustrated by cross members (not shown) and screen retaining brackets (not shown), neither of which form part of the invention.

At the upper end of the trough-like member 10, a vibratory exciter, generally designated 22, is mounted by means of bolts 24 and nuts 26 extending through apertures 28 in the upper walls of the trough-like member 10. As illustrated in FIG. 1, a greater number of the apertures 28 are provided than are necessary for securing the vibrating mechanism 22 to the trough-like member 10 so that the position of the former with respect to the latter may be selectively varied if desired. Through such structure, bi-directional conveying or pure vibratory motion can be achieved with the apparatus as explained in greater detail in my copending application Ser. No. 160,679, filed July 8, 1971 and entitled "Vibratory Handling Device With Variable Force Application." However, it is to be understood that if a particular installation does not require variable force application, those apertures 28 in excess of the number actually required to secure the vibratory unit 22 to the trough-like member may be omitted as surplusage, there being no need for their presence as, for example, to permit adjustment of the unit 22 for the purpose of aligning the direction of force application so that the same will pass through the center of gravity of the apparatus.

The trough-like member 10 is mounted for vibratory movement by means of upstanding ears 30 mounting eyelets 32 for receipt of suspendatory cables 34.

Figure 2:
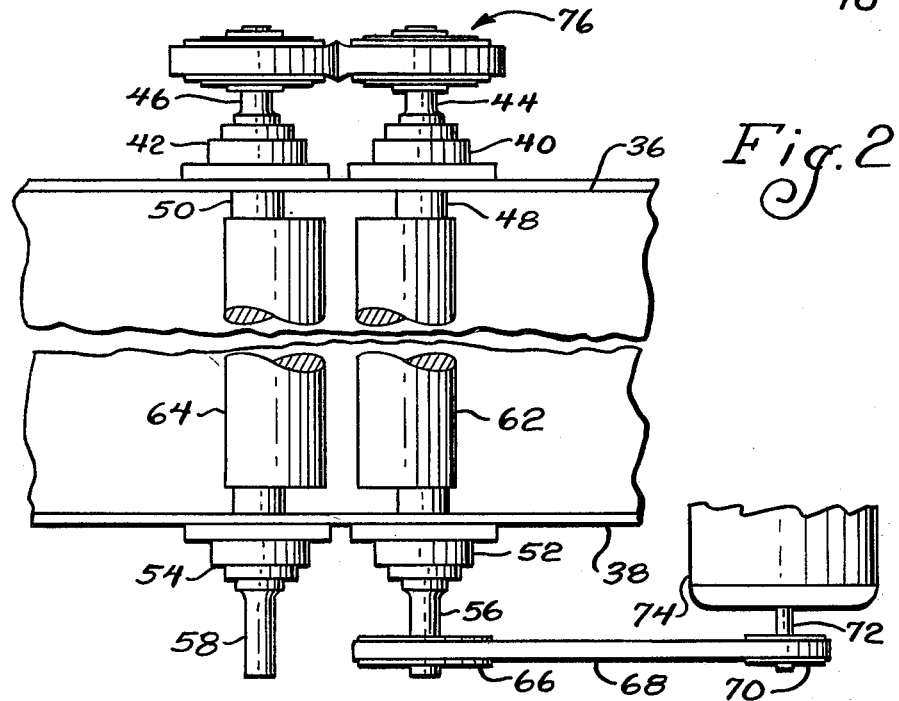
FIG. 2 is a plan view of a vibratory exciter made according to the invention and employed in the apparatus.
Figure 3:
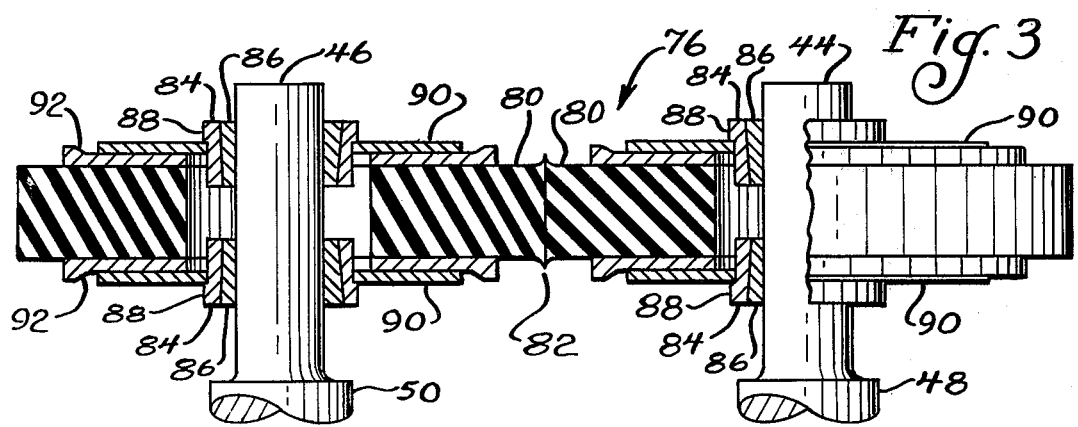
FIG. 3 is an enlarged view of a preferred form of means interconnecting the shafts of the vibratory exciter and made according to the invention.

With reference now to FIGS. 2 and 3, the construction of the exciter 22 will be described in greater detail. Within any suitable housing for the exciter mechanism, there are provided a pair of spaced plates 36 and 38. The plate 36 mounts bearings 40 and 42 for journalling the ends 44 and 46 of shafts 48 and 50, respectively. The plate 38 mounts similar bearings 52 and 54 for journalling ends 56 and 58 of the shafts 48 and 50, respectively. The arrangement is such that the axes of rotation of the shafts 48 and 50 are parallel.

Between the plates 36 and 38, each of the shafts 48 and 50 includes an eccentric portion 62 and 64, respectively.

The shaft 48, at its end 56, mounts a sheave 66 about which is trained a belt 68. The belt 68 is also trained about a sheave 70 on the output shaft 72 of a motor 74. Thus, when the motor 74 is energized, the shaft 48 will be rotated.

The ends 44 and 46 of the shafts 48 and 50 mount interconnecting means, generally designated 76, which is operative to cause the shaft 50 to be rotated oppositely of the direction of rotation of the shaft 48 at the same angular velocity when the shaft 48 is being driven by the motor 74. The interconnecting means 76 are such that a substantially positive driving connection is established between the shafts 48 and 50 but is also such that an elastic creeping may occur to permit the angular relation of the eccentrics 62 and 64 to realign into synchronism with each other to establish a vibratory force passing through the center of gravity of the apparatus.

Referring specifically to FIG. 3, the interconnecting means 76 are shown in detail. Specifically, the interconnecting means 76 is comprised of a pair of cylindrical, resilient discs 80 formed of a material such as rubber. The discs 80 have identical diameters and each is mounted on a respective one of the shaft ends 44 and 46. The diameters of the discs 80 are chosen to be slightly greater than the distance between the rotational axes of the shafts 48 and 50. Moreover, the discs 80 are mounted on the shaft ends 44 and 46 so as to be aligned in a direction transverse to the rotational axes of the shafts 48 and 50 and, therefore, are in contact with each other at an interface shown at 82.

As a result of the foregoing dimensions and the fact that the discs 80 are formed of a resilient material, there will be some distortion at the interface or point of contact of the two as illustrated in FIG. 3. This provides for a substantial area of contact between the two discs with both discs 80 deforming equally. As a result, corresponding contacting points on the discs do not move relative to each other while deformed (sometimes called squirming) and frictional wear is minimized.

The discs 80 are mounted for rotation with their respective shafts by a conventional, tapered type of frictional keying means having elements 84 and 86. The elements 84 each include a radially extending shoulder 88 which embraces a disc 90 which, in turn, embraces an additional, slightly larger disc 92 which extends to a point a short distance short of the cylindrical periphery of the resilient discs 80. The arrangement is such that the resilient discs 80 are clamped between the discs 90 and 92 and are supported on their ends by the discs 90 and 92 so that substantially the only distortion of the same due to their resiliency and the nature of the contact between the two discs 80 can occur only radially outwardly of the periphery of the discs 92. This insures good frictional contact between the discs 80 at the interface 82.

From the foregoing, it will be appreciated that the discs 80 establish a substantially positive driving connection between the shafts 48 and 50 due to the high coefficient of friction of the material, preferably rubber, used to form the discs 80. On the other hand, it will be appreciated that since the connection is a frictional one, elastic creeping may occur in some instances.

Returning now to FIG. 1, in the case of a conventional exciter wherein the two shafts are interconnected by the usual means, namely gears, and the eccentrics on the shafts have the usual initial configuration, force application to the material handling device 10 will generally occur along the line designated 100.

As can be seen, for the particular location of the exciter on the mechanism, the line 100 does not pass through the center of gravity designated at 102. As a result, there will be backlash between the gears and the amplitude of the vibratory force placed upon the apparatus 10 will vary from one end to the other.

With such a prior art apparatus, it would be necessary to either shift the exciter to the left, as viewed in FIG. 1, until such time as the line 100 passes through the center of gravity or, disassemble the exciter and change the angular relationship of the eccentrics on the two shafts with respect to each other. In either case, considerable and costly effort is required. However, with an exciter 22 made according to the invention, by reason of the interconnecting means 76 allowing elastic creeping, when the device is operated, the angular relationship of the eccentrics 62 and 64 will change until such time as the direction of force application is applied along the line 104 which passes through the center of gravity 102. Thus, applicant's exciter includes structure which allows the angular relationship of the eccentrics to synchronize relative to each other and to the center of gravity 102 to eliminate the foregoing problems.

In the event the apparatus may be required to peform bi-directional conveying, as mentioned previously, and the additional apertures 28 are provided, the exciter 22 may be moved to the dotted line position shown in FIG. 1 and, again, when operated, there will be self-synchronization of the eccentrics 62 and 64 with respect to each other and to a new center of gravity 106 (the center of gravity 102 will have shifted to the left by reason of the shifting of the exciter 22 to the left).

Thus, a vibratory material handling device made according to the invention eliminates noise and backlash problems heretofore found in those exciters employing a pair of parallel, eccentric shafts driven by a single prime mover. In addition, it automatically eliminates vibration amplitude variations along the length of the material handling apparatus by reason of the automatic compensation and shifting of the line of force application to pass through the center of gravity. Finally, the use of the invention eliminates the need for time-consuming adjustments at the time of installation as well as any need for providing adjustable exciter locating means during the manufacturing process.

I claim:

1. In a vibratory material handling device including a material engaging surface adapted to engage material to be handled, and means for vibrating the surface including a pair of rotary shafts each mounting an eccentric weight, a prime mover for rotating one of the shafts, an interconnecting means extending between the shafts whereby when the one shaft is rotated, the other will be rotated in the opposite direction, the improvement wherein said interconnecting means comprises means for establishing a substantially positive driving connection while allowing limited slippage so that said eccentric weights may synchronize relative to each other to impart a vibratory force to said surface passing through the center of gravity of said apparatus.

2. The vibratory material handling device of claim 1 further including means for selectively adjustably securing said vibrating means to said device at any of a variety of different positions with respect to said surface.

3. In a vibratory material handling device including a material engaging surface adapted to engage material to be handled, and means for vibrating the surface including a pair of rotary shafts each mounting an eccentric weight, a prime mover for rotating one of the shafts, an interconnecting means extending between the shafts whereby when the one shaft is rotated, the other will be rotated in the opposite direction, the improvement wherein said interconnecting means comprises means for establishing a substantially positive driving connection while allowing limited slippage so that said eccentric weights may synchronize relative to each other and to the center of gravity of said apparatus, said drive connection establishing means comprising a pair of cylindrical discs of the same diameter, said discs being mounted on respective ones of said shafts with their cylindrical peripheries in engagement with each other, said discs being formed of a resilient material having a relatively high coefficient of friction such as rubber.

4. Material handling apparatus according to claim 3 wherein the spacing between said shafts and the diameter of said discs is such that said discs are distorted at their point of contact to define an area of contact therebetween.

5. In a material handling apparatus having a material handling surface adapted to receive material to be handled and means for vibrating said surface including a pair of generally parallel, rotary shafts each eccentrically bearing respective weights and adapted to be driven in opposite directions and in such a way as to synchronize with each other, and drive means for said shafts, the improvement wherein means are provided to interconnect said shafts for substantially positive driving movement while allowing minimum slippage so that said shafts and the respective weights borne thereby may synchronize relative to each other to impart a vibratory force to said surface passing through the center of gravity of said apparatus; and wherein said drive means constitutes a single prime mover drivingly connected to one of said shafts.

6. Material handling apparatus according to claim 5 wherein said shaft interconnecting means comprises interengaging elements having high coefficients of friction at their point of contact.

* * * * *